US008738452B2

(12) United States Patent
Fowler (10) Patent No.: US 8,738,452 B2
(45) Date of Patent: May 27, 2014

(54) PROCESSING SEPARATE ITEMS VIA A SINGLE RETAILER ACTION

(75) Inventor: Susan L. Fowler, Liberty, MO (US)

(73) Assignee: Hallmark Cards, Incorporated, Kansas City, MO (US)

( * ) Notice: Subject to any disclaimer, the term of this patent is extended or adjusted under 35 U.S.C. 154(b) by 0 days.

(21) Appl. No.: 12/956,440

(22) Filed: Nov. 30, 2010

(65) Prior Publication Data

US 2011/0258059 A1      Oct. 20, 2011

(51) Int. Cl.
*G06Q 20/00* (2012.01)
(52) U.S. Cl.
USPC ............ 705/20; 235/380; 235/381; 235/454; 235/383; 235/375; 235/379; 235/494; 283/57; 283/74; 283/62; 705/39; 705/59; 705/41; 705/17; 705/24; 705/35; 705/44
(58) Field of Classification Search
USPC ........................................................ 705/20
See application file for complete search history.

(56) References Cited

U.S. PATENT DOCUMENTS

| 5,777,305 | A | 7/1998 | Smith et al. | |
| 6,224,108 | B1 | 5/2001 | Klure | |
| 6,328,341 | B2 | 12/2001 | Klure | |
| 6,439,613 | B2 | 8/2002 | Klure | |
| 6,543,809 | B1 | 4/2003 | Kistner | |
| 6,715,795 | B2 | 4/2004 | Klure | |
| 7,024,807 | B2 | 4/2006 | Street | |
| 7,578,439 | B2 * | 8/2009 | Graves et al. | 235/380 |
| 2004/0205138 | A1 * | 10/2004 | Friedman et al. | 709/206 |

OTHER PUBLICATIONS

American Greetings Corp.—Annual/10K Report, 2010.*

* cited by examiner

*Primary Examiner* — F. Zeender
*Assistant Examiner* — Fawaad Haider
(74) *Attorney, Agent, or Firm* — Shook, Hardy & Bacon L.L.P.

(57) ABSTRACT

A method, system, and medium are provided for processing multiple items for retail sale via a single retailer action. Upon scanning a machine-readable marking that is associated with multiple items provided by various vendors, a marking identifier associated with the machine-readable marking is recognized. The marking identifier corresponds with each price of the multiple items. Each price of the multiple items is presented to a consumer for payment that can be disbursed to the appropriate vendors.

5 Claims, 10 Drawing Sheets

PROCESSING SEPARATE ITEMS VIA A SINGLE RETAILER ACTION

BACKGROUND OF THE INVENTION

Oftentimes, to purchase a gift card and a greeting card, both items must be purchased separately and both a barcode of the gift card and a barcode of the greeting card must be independently scanned. For example, assume a consumer would like to purchase a gift card 100A of FIG. 1A. Generally, as illustrated in FIG. 1B, a gift card 100B is sold in connection with a paper carrier 102B that secures the gift card 100B and presents it for retail display. In some cases, the front of the paper carrier includes details of the gift card, such as the gift card amount 104B. As illustrated in FIG. 1C, the rear face of the paper carrier 102C includes a barcode 106C and a magnetic strip 108C. The barcode 106C is utilized to initiate a sale of the gift card 100C, and the magnetic strip 108C is utilized to activate the gift card 100C such that the gift card 100C can be used to purchase items. In conventional implementations, the paper carrier 102C is treated as mere packaging and does not result in an additional cost charged to a consumer.

Figure 1A:
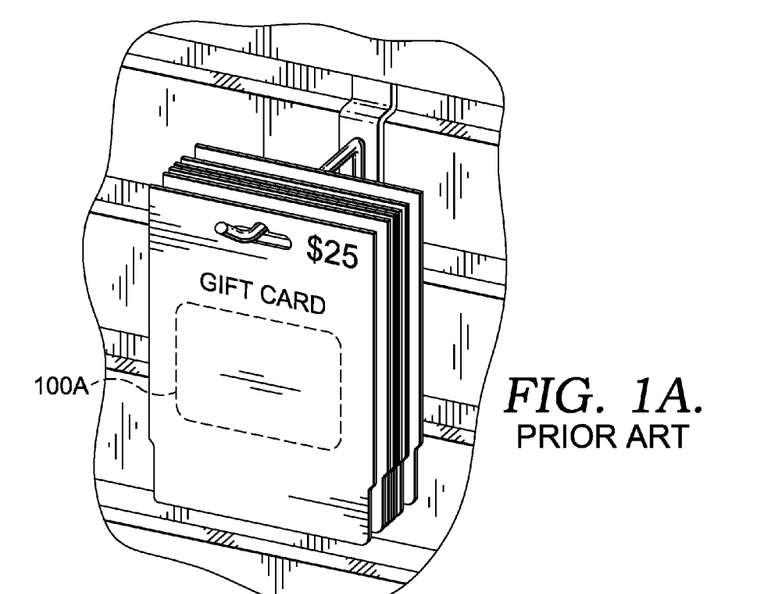
FIG. 1A is a perspective view illustrating a gift card secured within to a paper carrier and displayed for retail sale.
Figures 1B, 1C:
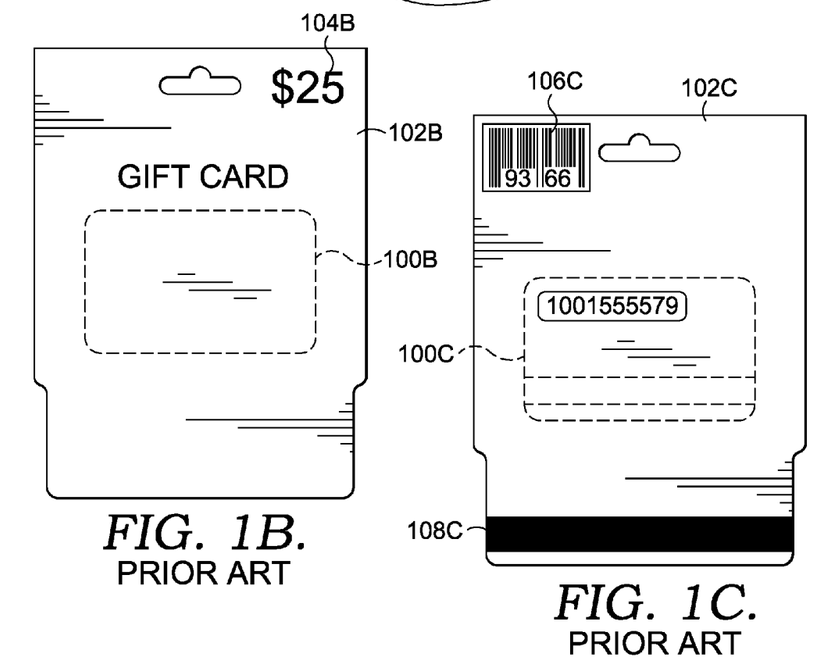
FIG. 1B is a front elevational view of a gift card secured to a paper carrier.
FIG. 1C is a rear elevational view of a gift card secured to a paper carrier.
Figure 1D:
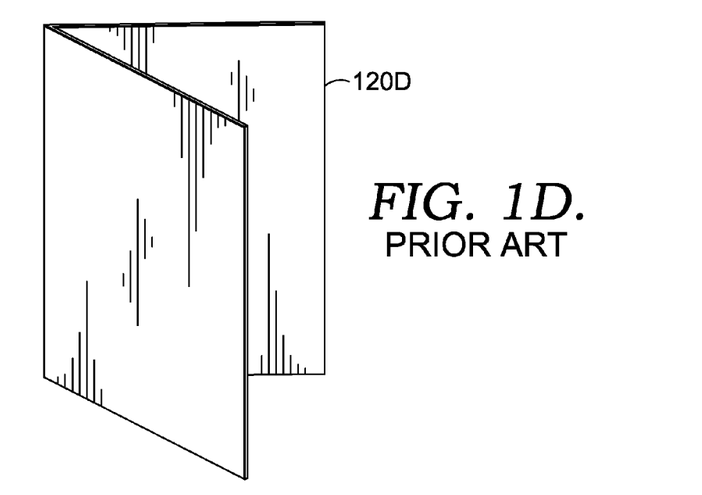
FIG. 1D is a perspective view illustrating a greeting card.
Figure 1E:
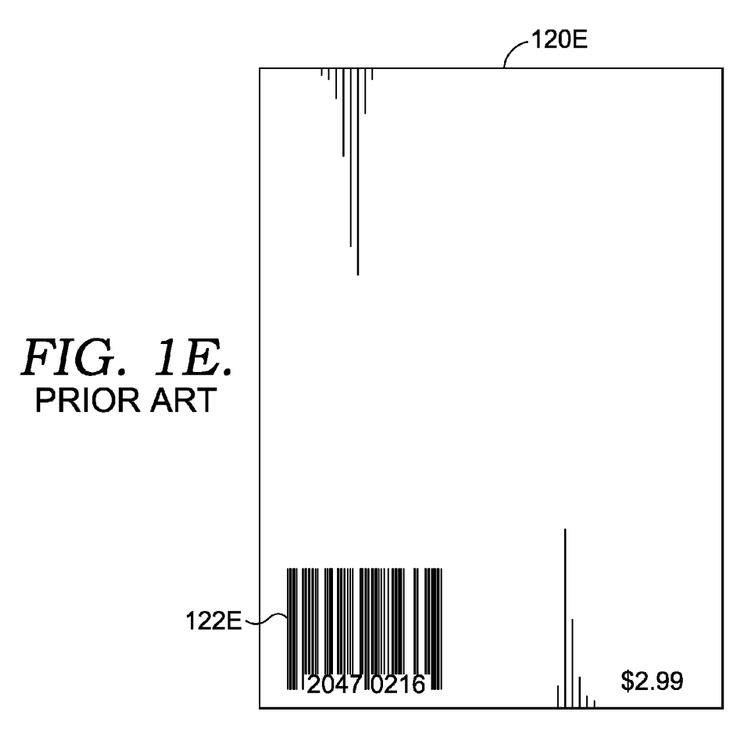
FIG. 1E is a rear elevational view of a greeting card.

Further assume that the consumer would also like to purchase a greeting card 120D of FIG. 1D to send and hold the gift card 100A of FIG. 1A. As illustrated in FIG. 1E, the rear face of the greeting card 120E includes a barcode 122E used to initiate a sale of the greeting card 120E. To purchase both the gift card 100C of FIG. 1C and the greeting card 120E of FIG. 1E, both the barcode 106C associated with the gift card 100C of FIG. 1C and the barcode 122E associated with the greeting card 120E of FIG. 1E must be independently scanned. Upon scanning the barcode 106C associated with the gift card 100C of FIG. 1C, the price of the gift card is charged to the consumer. Similarly, upon scanning the barcode 122E associated with the greeting card 120E of FIG. 1E, the price of the greeting card is charged to the consumer.

Such an implementation is inefficient in that separate barcodes must be scanned to initiate a sale of each individual item. Further, using such an implementation prevents a gift card and a greeting card (or any combination of multiple items) provided by separate vendors from being sold as a single product with a single barcode.

SUMMARY

Embodiments of the present invention include processing multiple items based on a single retailer action. In this regard, two or more items from separate vendors can be sold as a single product. A single computer-readable marking associated with each of the items can be scanned to initiate a sale of the combined product including two or more items. Upon scanning the computer-readable marking, the prices associated with each of the items can be referenced and jointly charged to a consumer. After receiving payment of the product, payments to the appropriate vendors can be disbursed. This summary is not intended to identify key features or essential features of the claimed subject matter, nor is it intended to be used as an aid in isolation to determine the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements, but the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the present invention may be embodied as, among other things: a method, system, or set of instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention are directed to processing separate items via a single retailer action. Stated differently, embodiments of the present invention are directed to facilitating multiple charges and/or multiple disbursements via a single retailer action. In this regard, multiple items can be charged to a consumer and/or payment for multiple items can be disbursed to vendors using a single retailer action. As such, multiple associated items can be jointly charged to a consumer and/or payment of multiple associated items can be separately disbursed to vendors based on a single retailer action. A retailer action, as used herein, refers to an action performed by a retail personnel that initiates a sale of a product and/or service. A retailer action may be, for example, the act of initiating a scan of machine-readable data. By way of example and not limitation, machine-readable data may be a barcode, a universal product code (UPC), a magnetic strip, or the like. As such, a single scan of a barcode related to an item results in multiple associated items being separately charged to a consumer and/or payment of such items being separately disbursed to one or more vendors. As can be appreciated, in some embodiments, a consumer may be considered a retail personnel that performs an action, such as scanning a barcode. For instance, self-checkout is frequently utilized in which a consumer initiates scanning a barcode to initiate a sale of a product.

An item, as used herein, refers to a product or service that would typically be purchased independent from other items. For instance, a greeting card is typically purchased independent from other products. Similarly, a gift card is typically purchased independent from other products. An item is provided by a particular vendor that receives a disbursement when a retailer completes a sale of the item. In embodiments of the present invention, multiple items are processed (e.g., charged or payment disbursed) in accordance with a single retailer action (e.g., a scan of a barcode associated with at least one of the items). In some cases, multiple associated items are packaged, assembled, or grouped together. As used herein, a multi-item product is used to refer to multiple associated items being packaged, assembled, or grouped together. In this regard, a multi-item product includes multiple items that are sold together. In one embodiment, at least two of the multiple items are associated with different vendors such that payment for the multi-item product is disbursed to at least two different vendors. While a multi-item product may have more than one machine-readable data, only one machine-readable data needs to be scanned to initiate a sale of the multi-item product including each item of the multi-item product (e.g., a charge for each item and/or a payment disbursement for each item).

A charge refers to a price or fee imposed or asked to be paid by a consumer in exchange for a product or service (e.g., an item(s), a multi-item product). A consumer is a person or organization that purchases a product or service. A disbursement refers to a payment of money to a vendor upon completion of a sale of a product or service provided by a vendor. A vendor is an entity, such as an individual, organization, or a company, that provides or supplies a product or service to a retailer and, in exchange, is paid for a sale of the product or service to a consumer. Accordingly, a vendor may be a manufacturer, a distributor, an aggregator or a retailer of goods or services. For instance, assume a multi-item product includes both a greeting card and a gift card. In such a case, a first vendor may be a manufacturer or distributor of the greeting card and a second vendor may be a retailer that issued the gift card or an aggregator who produces the gift card and sells it on behalf of the retailer to which the card pertains or where the card may be redeemed.

By way of example only, and as described in further detail below, a charge associated with a greeting card and a charge associated with a gift card may be applied to a consumer via a single scan of a barcode (e.g., a barcode disposed on the gift card or a barcode disposed on a greeting card). In this way, at a point of sale, a gift card may be coupled with a greeting card to form a multi-item product which can be individually charged to a consumer and/or payment thereof separately disbursed to appropriate vendors when a single barcode is scanned. This allows two items (i.e., a gift card and a greeting card) to be charged separately to a consumer and payment thereof separately disbursed in accordance with the appropriate vendor while minimizing a number of retailer actions at the point of sale. In this regard, a retail personnel is only required to scan a single barcode to apply a charge for both the gift card and the greeting card. It also allows for two separate and unrelated companies to bundle their products together for sale, yet both still be paid individually and specifically for their product. Further, as described more fully below, applying separate charges and/or disbursements for multiple items sold as a single unit allows different tax implications to be appropriately applied to various items of a multi-item product. Continuing with this example, a tax may be applied to the gift card while a tax is not applicable to the gift card.

In the particular implementation that a multi-item product includes a greeting card and a gift card, embodiments of the present invention can be implemented in a variety of systems. For example, embodiments of the present invention can be implemented using a one-step activation process or a two-step activation process. A one-step activation process refers to a single step required to initiate a sale of multiple items (i.e., the greeting card and the gift card) and to initiate activation of the gift card. A two-step activation process refers to two steps, one action being required to initiate a sale of multiple items (i.e., the greeting card and the gift card) and a separate action being required to initiate activation of the gift card.

Figure 2A:
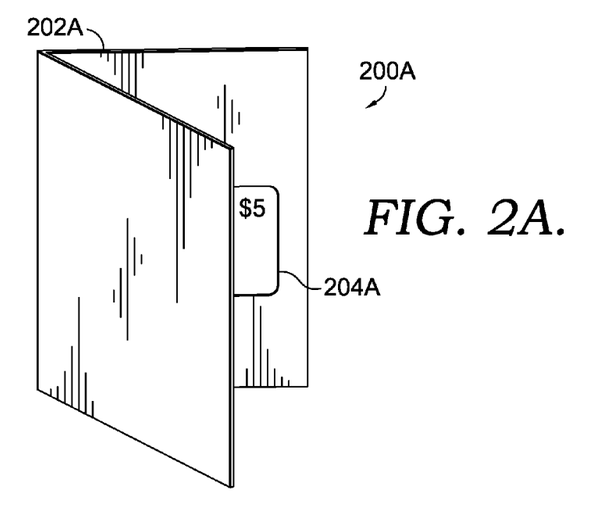
FIG. 2A is a perspective view illustrating a first multi-item product, in accordance with an embodiment of the present invention.

With reference to FIGS. 2A-2D, an embodiment of a multi-item product, including a greeting card and a gift card assembly, utilized in a two-step activation process is illustrated. FIG. 2A illustrates a multi-item product 200A including a greeting card 202A with a gift card 204A affixed to an interior portion of the greeting card 202A. As can be appreciated, the greeting card 202A and the gift card 204A are generally provided by two different vendors such that payment by a consumer for the multi-item product 200A is disbursed, as appropriate, to the two different vendors.

Figure 2B:
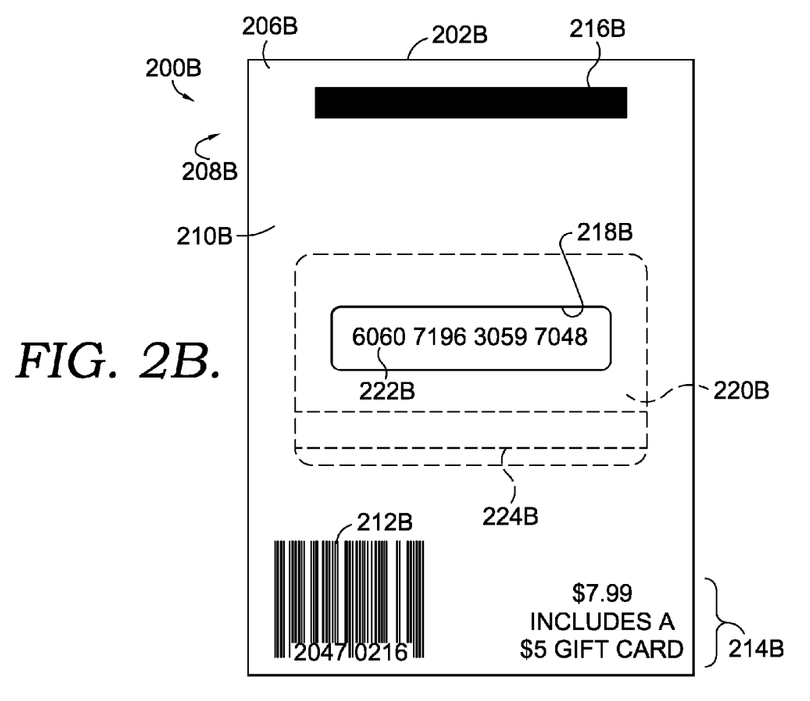
FIG. 2B illustrates a rear elevational view of the first multi-item product according to an embodiment of the present invention.

FIG. 2B illustrates a rear elevation view of the multi-item product 200B. The rear portion 206B of the greeting card 202B has a front face 208B facing the interior portion of the greeting card 202B and a rear face 210B facing the exterior portion of the greeting card 202B. The rear face 210B of the rear portion 206B of the greeting card 202B includes a UPC barcode 212B, a pricing portion 214B, a magnetic strip 216B, and an aperture 218B. Although the UPC barcode 212B, the pricing portion 214B, and the magnetic strip 216B are illustrated as positioned on the rear face 210B of the rear portion 206B of the greeting card 202B, such information can be positioned at any location of the multi-item product 200B. The magnetic strip is positioned inward of the edge of the rear portion 206B a sufficient distance so that the magnetic strip can be read when the multi-item product is passed through a magnetic strip reader.

The gift card 220B is positioned against the front face 208B of the rear portion 206B of the greeting card 202B such that a card number 222B is viewable through the aperture 218B. In embodiments, to ensure that the card number 222B remains viewable, the gift card 220B may be affixed to the greeting card 202B in any manner. For example, the gift card 220B may be removably bonded to the front face 208B of the rear portion 206B of the greeting card 202B using glue or another adhesive substance.

In operation, a retail personnel can scan the UPC barcode 212B to initiate a sale of the multi-item product 200B including the greeting card 202B and the gift card 220B. Upon receiving an indication to activate the gift card 220B, the retail personnel may then scan or swipe the magnetic strip 216B via or through a magnetic strip reader to activate the gift card 220B. In embodiments, the magnetic strip 216B includes data which correlates to the gift card number 222B and includes data which instructs activation of an account associated with the gift card number 222B. Should the magnetic strip 216B become damaged or not work for any reason, the gift card 220B may be activated by keying in the gift card number 222B. The pricing portion 214B provides a user with the cost associated with the greeting card 202B and with the gift card 220B. For example, the pricing portion 214B provides a user with an indication that the gift card is a $5.00 gift card while the greeting card cost is $2.99. While the pricing portion 214B provides a total multi-item product cost (i.e., $7.99) and a cost for the gift card item 220B (i.e., $5.00), the pricing portion 214B may provide cost indications for items in any manner including, for example, a total cost, a first item cost, a second item cost, a combination thereof, or the like.

Figure 2C:
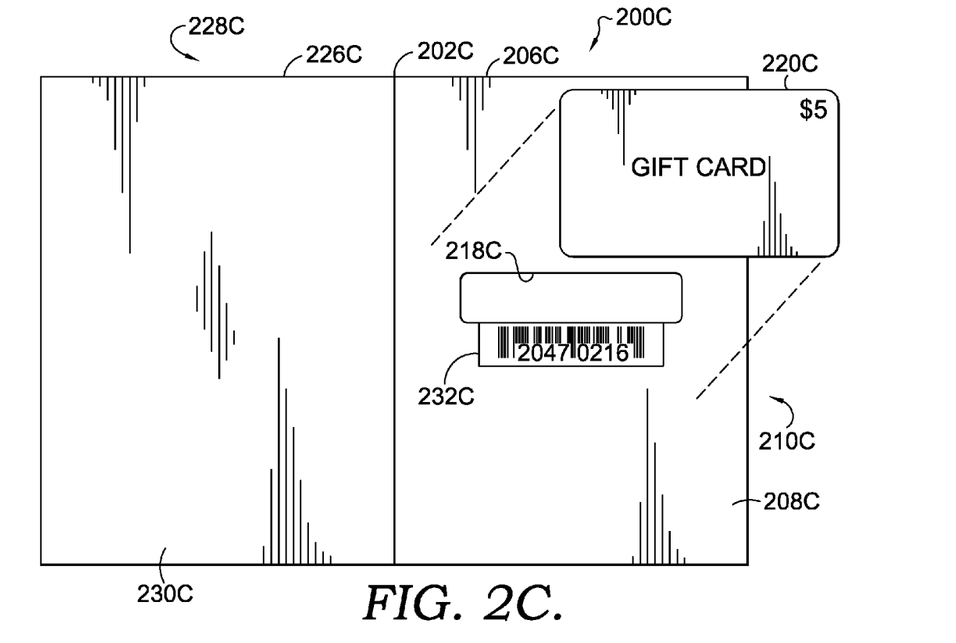
FIG. 2C illustrates an interior elevational view of the first multi-item product, in accordance with an embodiment of the present invention.

FIG. 2C illustrates an interior view of a multi-item product 200C. The multi-item product 200C includes a greeting card 202C and a gift card 220C. The greeting card 202C includes front portion 226C having a front face 228C and a rear face 230C and a rear portion 206C having a front face 208C and a rear face 210C. As illustrated in FIG. 2C, the rear portion 206C of the greeting card 202C also includes an aperture 218C and a UPC barcode 232C. The aperture 218C enables the rear portion of the gift card 220C to be viewable through the aperture 218C. The UPC barcode 232C represents the greeting card UPC. When the gift card 220C is affixed to the front face 208C of the rear portion 206C of the greeting card 202C, in embodiments, the bottom portion of the gift card 220C may cover the UPC barcode 232C such that it is not readily viewable by a user when the greeting card 202C is in an open position. The UPC barcode 232C may be used in the assembly process to associate the specific greeting card 202C with the specific gift card 220C that is being affixed thereto for tracking purposes.

Figure 2D:
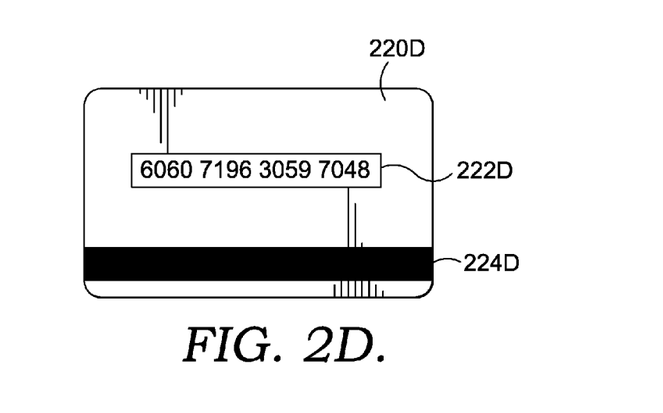
FIG. 2D illustrates a rear elevational view of a gift card of the first multi-item product according to an embodiment of the present invention.

FIG. 2D illustrates a rear elevational view of the gift card 220D that may be included within a multi-item product. The gift card 220D includes card number 222D and a magnetic strip 224D. The card number 222D and/or the magnetic strip 224D can be utilized to activate the gift card 220D and/or to utilize the gift card 220D.

In some prior art gift cards, the magnetic strip on the gift card can have multiple tracks of data/information. In some cases, the magnetic strip has one track for activation of the card and another track for redemption of all or portion of the value of the card. In this manner, swiping the same magnetic strip on the gift card can initiate both activation and redemption. In embodiments of the present invention, in the two-step activation process, the magnetic strip 216B on the rear face 210B of the rear portion 206B of the greeting card 202B may include only activation data and the magnetic strip 224D on the gift card 220D may include only redemption data. In this manner, a consumer may not use the magnetic strip 216B of the greeting card 202B to redeem the value associated with the gift card 220D.

Figure 3A:
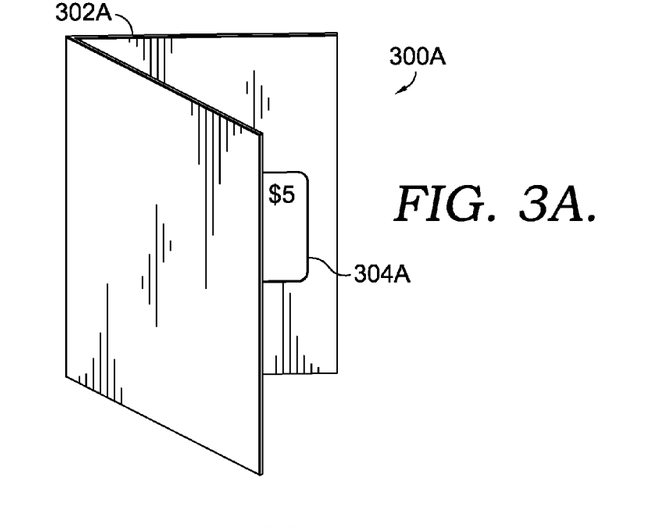
FIG. 3A is a perspective view illustrating a second multi-item product, in accordance with an embodiment of the present invention.

With reference to FIGS. 3A-3D, an embodiment of a multi-item product, including a greeting card and a gift card assembly, utilized in a one-step activation process is illustrated. FIG. 3A illustrates a multi-item product 300A including a greeting card 302A with a gift card 304A affixed to the interior portion of the greeting card 302A. As can be appreciated, the greeting card 302A and the gift card 304A are generally provided by two different vendors such that payment by a consumer for the multi-item product 300A is disbursed, as appropriate, to the two different vendors.

Figure 3B:
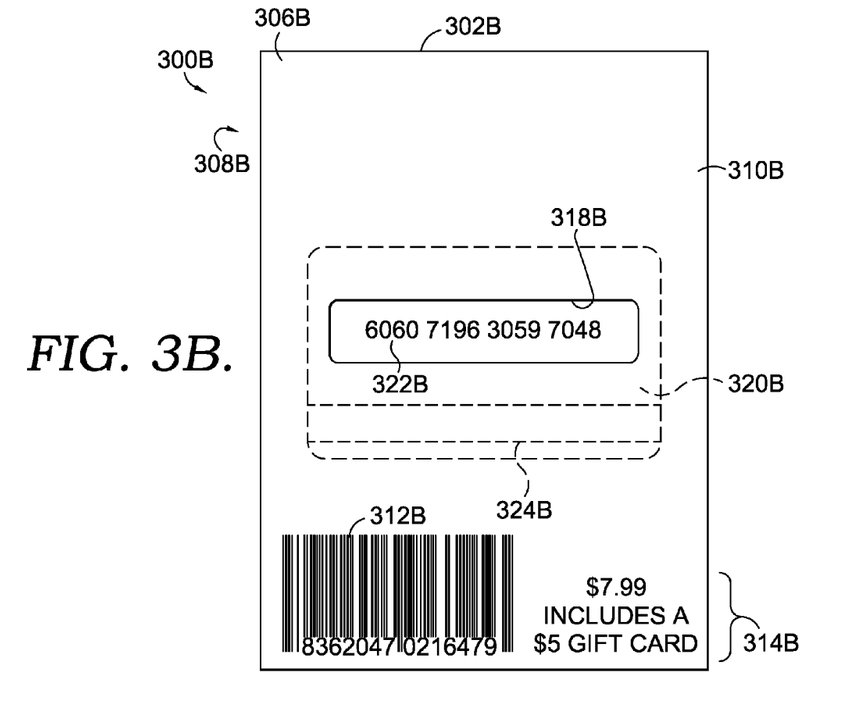
FIG. 3B illustrates a rear elevational view of the second multi-item product according to an embodiment of the present invention.

FIG. 3B illustrates a rear elevational view of the multi-item product 300B. The rear portion 306B of the greeting card 302B has a front face 308B facing the interior portion of the greeting card 302B and a rear face 310B facing the exterior portion of the greeting card 302B. The rear face 310B of the rear portion 306B of the greeting card 302B includes a barcode 312B, a pricing portion 314B, and an aperture 318B. Although the barcode 312B and the pricing portion 314B are illustrated as positioned on the rear face 310B of the rear portion 306B of the greeting card 302B, such information can be positioned at any location of the multi-item product 300B. As can be appreciated, the barcode 312B utilizes a format that can initiate a sale of the multi-item product 300B and that can initiate activation of the gift card 320B with only one scan of the barcode 312B. In embodiments, the barcode 312B may be any barcode and have any length, such as, for example, 32 digits. A barcode may be any optical machine-readable representation of data including a one-dimensional barcode or symbology or a two-dimensional barcode or symbology.

The gift card 320B is positioned against the front face 308B of the rear portion 306B of the greeting card 302B such that a card number 322B is viewable through the aperture 318B. In some cases, the magnetic strip 324B may also be viewable through the aperture 218B. In embodiments, to ensure that the card number 322B remains viewable, the gift card 320B may be affixed to the greeting card 302B in any manner. For example, the gift card 320B may be removably bonded to the front face 308B of the rear portion 306B of the greeting card 302B using glue or another adhesive substance.

In operation, a retail personnel can scan the barcode 312B to initiate both a sale of the multi-item product 300B including the greeting card 302B and the gift card 320B, as well as activation of the gift card 320B. Accordingly, the retail personnel only needs to perform one action to result in initiation of both the sale of the multi-item product 300B and activation of the gift card 320B. That is, the retail personnel is not required to scan any magnetic strip. The pricing portion 314B provides a user with the cost associated with the greeting card 302B and the gift card 320B. For example, the pricing portion 314B provides a user with an indication that the gift card is a $5.00 gift card while the greeting card cost is $2.99. While pricing portion 314B provides a total multi-item product cost (i.e., $7.99) and a cost for the gift card item 320B (i.e., $5.00), the pricing portion 314B may provide cost indications for items in any manner including, for example, a total cost, a first item cost, a second item cost, a combination thereof, or the like.

Figure 3C:
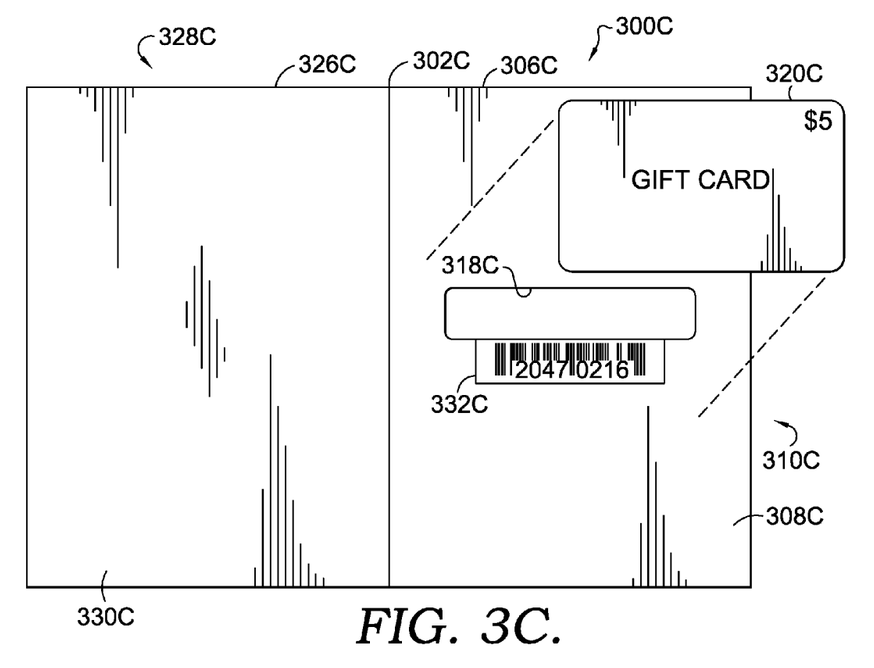
FIG. 3C illustrates an interior elevational view of the second multi-item product, in accordance with an embodiment of the present invention.

FIG. 3C illustrates an interior view of a multi-item product 300C. The multi-item product 300C includes a greeting card 302C and a gift card 320C. The greeting card 302C includes front portion 326C having a front face 328C and a rear face 330C and a rear portion 306C having a front face 308C and a rear face 310C. As illustrated in FIG. 3C, the rear portion 306C of the greeting card 302C also includes an aperture 318C and a barcode 332C. The aperture 318C enables the rear portion of the gift card 320C to be viewable through the aperture 318C. The barcode 332C may be a duplicate of a barcode located on the rear face 310C of the rear portion 306C of the greeting card 302C, for example, barcode 312B of FIG. 3B. When the gift card 320C is affixed to the front face 308C of the rear portion 306C of the greeting card 302C, in embodiments, the bottom portion of the gift card 320C may cover the barcode 332C such that it is not readily viewable by a user when the greeting card 302C is in an open position. In this regard, a user may lift the bottom portion of the gift card 320C or remove the gift card 320C to view or scan the barcode 332C.

Figure 3D:
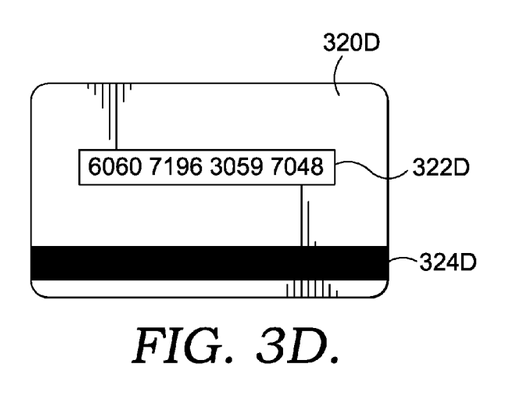
FIG. 3D illustrates a rear elevational view of a gift card of the second multi-item product according to an embodiment of the present invention.

FIG. 3D illustrates a rear elevation view of the gift card 320D that is included within a multi-item product. The gift card 320D includes card number 322D and a magnetic strip 324D. The card number 322D and/or the magnetic strip 324D can be utilized to activate the gift card 320D and/or to utilize the gift card 320D. FIGS. 2A-2D and FIGS. 3A-3D are provided herein to illustrate examples of implementations of the present invention and are not intended to limit the scope of the invention.

Figure 3E:
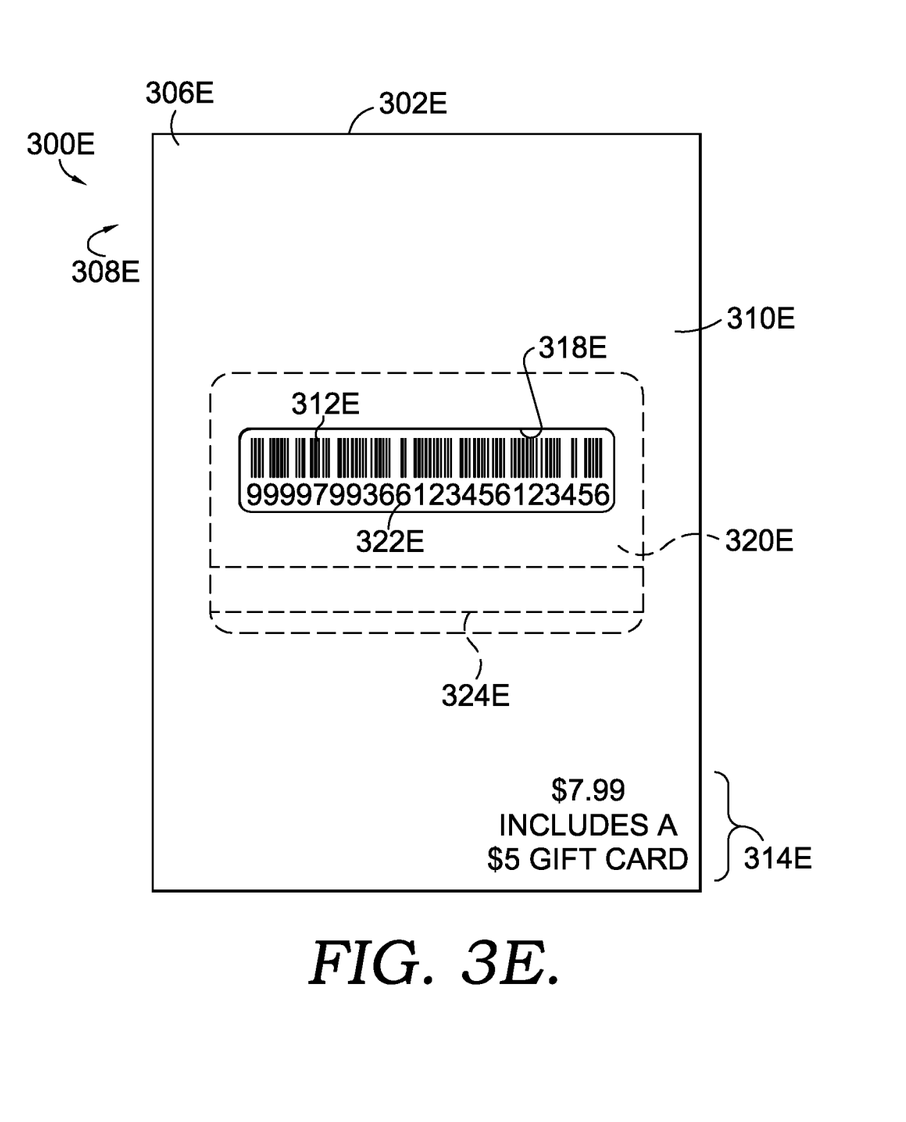
FIG. 3E illustrates a rear elevational view of the second multi-item product according to an alternate embodiment of the present invention.

FIG. 3E illustrates an alternate embodiment of a multi-item product, including a greeting card and a gift card assembly, utilized in the one-step activation process discussed above. FIG. 3E is similar to FIG. 3B in that it too illustrates a rear elevational view of a multi-item product 300E. In this embodiment, however, instead of the bar code for purchasing the multi-item product 300E being on the rear face 310E of the rear portion 306E of the greeting card 302E, as it was in FIG. 3B, here the bar code 312E is on a rear face 324E of the gift card 320E that is viewable through the aperture 318E in the rear portion 306E of the greeting card 302E. Accordingly, scanning of the bar code 312E initiates the sales transaction of both the greeting card 302E and the gift card 320E and activation of the gift card 320E.

It should be noted that, in embodiments of the present invention, the card number on the gift card, such as card number 322E, may convey that it is associated with a multi-item product and include information that pertains to the items in the multi-item product. By way of example only and not in a limiting manner, in embodiments of the present invention, the card number on the gift card, such as card number 322E, may be a 32 digit number, where eleven digits are the greeting card UPC, eleven digits are the gift card UPC, and the remaining digits are the gift card account number.

Figure 4:
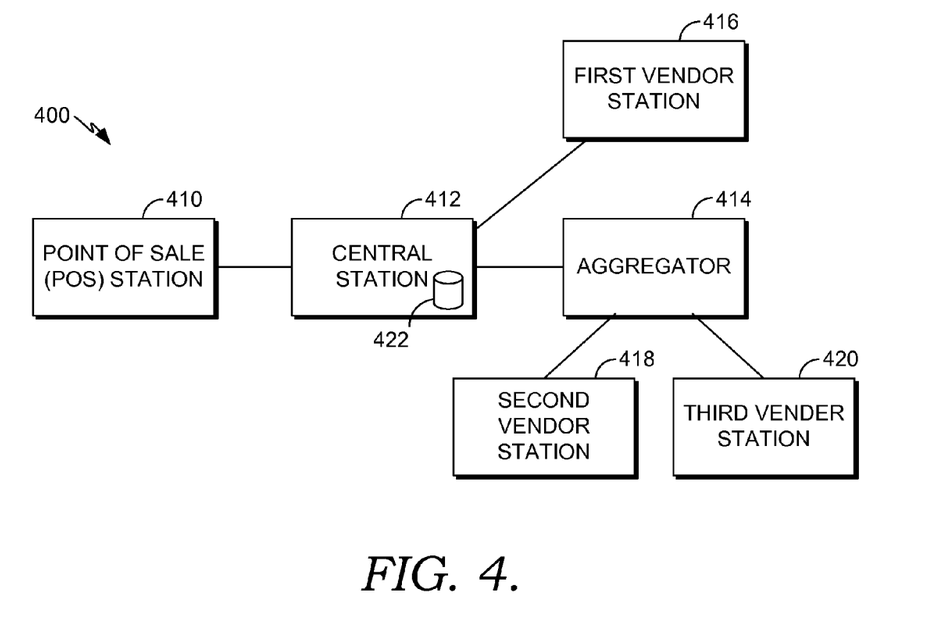
FIG. 4 is a block diagram of an exemplary computing system that is suitable for operation of an embodiment of the present invention.

Referring now to FIG. 4, a computing system 400 for practicing an embodiment of the present invention is provided. As shown in FIG. 4, an exemplary computing system 400 includes a point of sale (POS) station 410, a central station 412, an aggregator 414, a first vendor station 416, a second vendor station 418, and a third vendor station 420. The computing system 400 shown in FIG. 4 is an example of one suitable computing system and is not intended to suggest any limitation as to the scope of use or functionality of embodiments of the inventions disclosed throughout this document. Neither should the exemplary computing system 400 be interpreted as having any dependency or requirement related to any single component or combination of components illustrated therein. For example, numerous vendor stations may be in communication with the aggregator 414 and/or the central station 412, either directly or indirectly.

The POS station 410, the central station 412, the aggregator 414, the first vendor station 416, the second vendor station 418, and the third vendor station 420 are capable of communicating with one another. For example, one or more of the components may communicate with one another through a network, which may include any number of networks such as, for example, a local area network (LAN), a wide area network (WAN), the Internet, a cellular network, a peer-to-peer (P2P) network, a mobile network, or a combination of networks.

Generally, the POS station 410 is utilized to register a sale of a product(s) and/or service(s). The POS station may include, for example, a computing device to perform processing and communications, a data store for storing data, one or more scanning devices to scan machine-readable data (e.g., barcodes, UPC barcodes, magnetic strips, etc.), and/or the like. A scanning device may be any device configured to scan and read machine-readable data, such as a barcode reader.

In embodiments, the POS station includes a scanning device that is used to scan a machine-readable marking that is disposed on a multi-item product to initiate a sale of the multi-item product. The machine readable marking can be, but is no limited to, a barcode, a UPC, a magnetic strip, or any other marking capable of being encoded with information that identifies the multi-item product or items in association therewith. As can be appreciated, the machine-readable marking can be associated with multiple items of a multi-item product. The scanning device, and/or a computing device in association therewith, scans the machine-readable marking and communicates a marking identifier to a central station. As such, the scanning device, and/or a computing device in association therewith, can scan and read the machine-readable marking and communicate a marking identifier to the central station 412. A marking identifier, as used herein, refers to an identifier that identifies a multi-item product, or items in association therewith. In this regard, a single marking identifier may be associated with multiple items of a multi-item product. A marking identifier may be in any form, such as letters, numbers, optical, digital, etc. In some embodiments, the marking identifier may be the actual machine-readable marking. In other embodiments, the machine-readable marking might be translated from an optical code to a digital code that is used as the marking identifier to identify the multi-item product, or item(s) in association therewith. In such an embodiment, the scanning device or computing device associated therewith determines, identifies, or recognizes a marking identifier based on the scanned machine-readable marking.

The central station 412 may be or include any computing device or plurality of computing devices (e.g., a server, a network of servers, a personal computer, etc.) and may be at or under the control of a retailer that is selling a multi-item product. Upon the central station 412 receiving a marking identifier, the central station 412 retrieves, accesses, or looks up item data corresponding with the multi-item product or each item associated with the marking identifier. For example, in some cases, a particular marking identifier may be directly associated with item data for multiple items. In other cases, a particular marking identifier may be directly associated with item data for a specific item (e.g., a greeting card) and may link to item data corresponding with an associated item (e.g., a gift card). Item data, as used herein, refers to any data describing, pertaining to, summarizing, or characterizing a particular item and/or a multi-item product. Item data may be, for instance, an item price of an item, a tax price of an item, a total price of an item (e.g., item price and tax price), a multi-item product price of a multi-item product, a tax price of a multi-item product, a total price of a multi-item product, a tax indicator that indicates a tax should be applied to the item, a non-tax indicator that indicates a tax should not be applied to the item, an activation indicator that indicates an item should be activated, a non-activation indicator that indicates an item should not be activated, a multi-item product indicator that indicates the marking identifier corresponds with a multi-item product, etc.

Item data can be looked up, referenced, retrieved, or accessed via data stored in association with the central station 412, such as within database 422, which may or may not be at the same physical location as the central station 412. For example, a lookup table or index may be used to store data such as marking identifiers and corresponding item data. In such a case, upon searching for and locating a particular marking identifier, item data associated with the marking identifier can be referenced, retrieved, or accessed. The item data, or a portion thereof, can then be communicated to the point of sale station 410 to complete a sale of a multi-item product. For example, the central station 412 may communicate item data, such as items and corresponding dollar amounts, tax indicators or tax prices, the marking identifier(s), number of items charged, total amount, vendor(s) to receive payment, activation request(s), etc. to the POS station 410.

By way of example only, a marking identifier may be associated with multiple item prices within the database 422. As such, a marking identifier corresponds with each item price for each separate item being purchased via a multi-item product. For instance and with reference to FIG. 2B, assume that the multi-item product 200B includes a $5.00 gift card 220B and a $2.99 greeting card 206B. Further assume that only the greeting card 206B is taxable. In such a case, the marking identifier recognized upon scanning the UPC barcode 212B is associated with a $5.00 gift card charge and a $2.99 greeting card charge, plus any applicable tax for the greeting card 206B. It should be noted, however, that in other examples, each or a portion of the multiple items may be taxed or taxed differently. In some cases, the central station 412 can identify the appropriate tax amount or percent. In such cases, the appropriate amount or percent may be included as a data item, for example, in database 422 or, alternatively, may be determined based on a tax indicator included as a data item. In other cases, an indication that taxes are required is simply communicated to the POS station 410 for a determination of such applicable taxes. In such cases, a tax indicator included as a data item may provide an indication to communicate a tax indicator to the POS station 410 for a determination of applicable taxes.

In some embodiments, the central station 412 recognizes that the marking identifier is associated with a multi-item product. Such a recognition may be performed prior to, simultaneous with, or upon identifying item data. Recognizing that the marking identifier is associated with a multi-item product may be based on the marking identifier, item data, and/or the like. An indication that a marking identifier is associated with a multi-item product (i.e., a multi-item product indicator) may be communicated to the point of sale station 410 such that the POS station 410 recognizes a multi-item product.

In an implementation utilizing a one-step activation process, the central station 412, or another component, may be utilized to activate an item(s), such as a gift card, or a multi-item product upon receiving the marking identifier. In this regard, the marking identifier or item data associated therewith (e.g., an activation indication), may provide an indication to activate an item. After recognizing that an item should be activated, the central station 412, aggregator 414, or another component, may activate the item such that the item can be readily used by a consumer. For example, assume that an item to be activated is a gift card. In such a case, upon activation, a consumer can use the gift card to make an appropriate purchase.

In an implementation utilizing a two-step activation process, the central station 412, or another component, may communicate an activation request to the point of sale station 410 to request a retail personnel to initiate activation of a multi-item product or an item(s) associated therewith. In such an implementation, the marking identifier or item data associated therewith (e.g., an activation indication), may provide an indication to activate an item. After recognizing that an item or multi-item product should be activated, the central station 412, or another component, may communicate an activation request to the point of sale station 410 (e.g., a message displayed on a monitor of the point of sale station 410 which instructs the retail personnel to activate the gift card by swiping it through a magnetic card reader).

Returning to the point of sale station 410, the point of sale station 410 receives item data. If a tax indicator is received indicating that a particular item of a multi-item product is to be taxed, the point of sale station 410 may determine an appropriate tax amount(s) or percent(s). If an activation request is received, for example in a two-step activation implementation, the point of sale station 410 presents or displays a request to activate a particular item via a display screen (e.g., a display monitor). In such a case, the retail attendant may initiate activation of the item, such as a gift card. Activation may be initiated in any manner including scanning a barcode, scanning a magnetic strip, or the like. Thereafter, an activation response may be communicated to the central station 412 or aggregator 414 to activate the item.

The point of sale station 410 presents one or more costs or prices associated with the multi-item product. In this regard, the point of sale station 410 may present a total cost or price for the multi-item product. That is, the multi-item product may be listed as one entry or charge on a sales receipt or display screen. In other embodiments, the point of sale station 410 may present a line item for each item associated with the multi-item product. For example, assume that a multi-item product includes a greeting card and a gift card. In such a case, a line item on a sales receipt or display screen may indicate the price for the greeting card, and a separate line item on the sales receipt may indicate the price for the gift card. As can be appreciated, the point of sale station 410 may present such costs via a display screen, a sales receipt, a combination thereof, or the like.

Upon the point of sale station 410 receiving payment for a multi-item product, or an indication thereof, a payment indicator is provided to the central station 412 and/or the aggregator 414 to indicate that payment for the multi-item product and items in association therewith is complete. A payment indicator provides an indication that payment has been made. Such a payment indicator initiates disbursement of payments to appropriate vendors. The payment indicator may also include information pertaining to the payment made, such as, the multi-item product, the marking identifier, the items of the multi-item product associated with the payment, the vendor associated with each item, the type of payment, etc.

The aggregator 414 receives a payment indicator, for example, from the central station 412. Although FIG. 4 illustrates the central station 412 in direct communication with the aggregator 414 and the first vendor 416, in other embodiments the central station 412, may be additionally or alternatively in communication with only the aggregator 414, only multiple aggregators, only the first vendor 416, only multiple vendors, or any combination thereof (e.g., to provide a payment indicator or an activation response). The aggregator 414 may be or include any computing device or plurality of computing devices (e.g., a server, a network of servers, a personal computer, etc.) and may be located at or under the control of a company that provides one of the products in the multi-item product, such as, for example, a company that handles and provides the greeting cards to retailers for sale.

Upon receiving the payment indicator, the company in control of the central station 412 (e.g., a retailer) can disburse appropriate payment amounts to appropriate vendors, for example, such as first vendor station 416 and/or to the aggregator 414. The aggregator 414 can then disburse appropriate payment amounts to appropriate vendors, for example, such as second vendor station 418 and third vendor station 420. In embodiments, the aggregator 414 may utilize information received in association with the payment indicator to determine an amount to pay, a particular vendor(s) to pay, etc. In other embodiments, an aggregator may reference a database, such as database 422 associated with the central station 412, to identify an amount to pay, a particular vendor(s) to pay, a gift card to be treated as activated, etc.

Upon identifying an amount to disburse to particular vendors, central station 412 and/or the aggregator 414 initiates disbursement in the identified amount to the identified vendors. The central station 412 and/or the aggregator 414 may disburse payments using an automated payment system.

By way of specific example, which should not limit the scope of the claimed invention, and with continued reference to FIG. 4 and in a one-step activation process, assume that a multi-item product associated with a first item (e.g., a greeting card) and a second item (e.g., a gift card) is purchased at a retail location. In such a case, a consumer selects the multi-item product and takes it to the point of sale station 410 for purchase. A retail personnel scans the single UPC for the multi-item product. The consumer is charged for each item of the multi-item product which can contain items that are treated differently from a tax purpose. In the present example of a $2.99 greeting card with a $5.00 gift card therein, the consumer is charged $2.99 plus tax for the greeting card and only $5.00 for the gift card, as gift cards are not taxed. Though not required, generally each item in the multi-item product will show up separately on a receipt, as if purchased and scanned separately. The consumer then pays the retailer, which may be represented in FIG. 4 as the central station 412. The retailer/central station 412 then recognizes that the first vendor station 416 (i.e., the greeting card manufacturer) associated with the first item (i.e., the greeting card) should receive whatever portion they are due for the $2.99 sale of the first item and that the aggregator 414 (i.e., the gift card supply company) that provided the second item (i.e., the gift card) should receive whatever portion they are due for the $5.00 sale of the second item. Accordingly, the retailer then disburses corresponding payments of a percentage of $2.99 to the first vendor station 416 and a percentage of $5.00 to the aggregator 414. The aggregator 414, in turn, disperses some portion of the payment received to the appropriate vendor station to which the second item pertained. In this example, the $5.00 for the second item/gift card is for credit to be used at some location (e.g., a restaurant or other retailer) by another in the future. That location is one of the vendors stations 418, 420. Accordingly, that $5.00 amount (less the share withheld by the retailer or operator 412 of the point of sale station 410 and the share withheld by the aggregator/credit card supplier 414) is in turn dispersed by the aggregator 414 to the appropriate vendor station 418, 420 (i.e., the vendor station that is location where the gift card is redeemable). In alternate embodiments, where an aggregator 414 is not responsible for one of the products, the aggregator 414 may be omitted and any number of vendor stations may be directly linked to the central station 412, as the first vendor station 416 is in FIG. 4.

Figure 5:
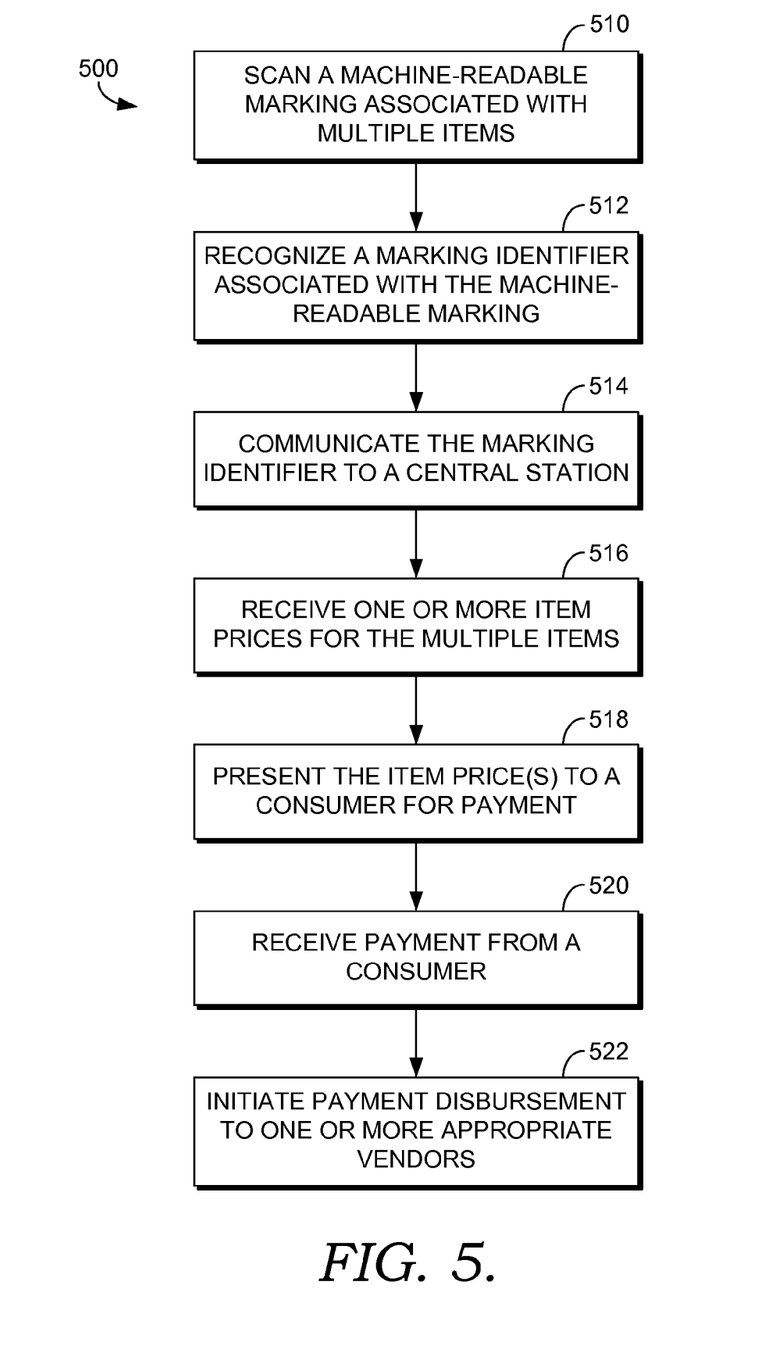
FIG. 5 is a flow chart which illustrates a first exemplary method for processing multiple items via a single retailer action, in accordance with an embodiment of the present invention.

By way of example only, and with reference to FIG. 5, an exemplary first method 500 for processing multiple items via a single retailer action is provided. The method 500 may be performed, for example, at a point of sale station, such as the point of sale station 410 of FIG. 4, at a retail location. Initially, as indicated at block 510, a machine-readable marking, such as a barcode or UPC, is scanned. Such scanning may be initiated by a retail attendee presenting or positioning the machine-readable marking such that the machine-readable marking can be scanned and read, for example, by a scanning or reading device. Such a machine-readable marking is associated with multiple items (e.g., multiple items of a multi-item product). For example, a machine-readable marking may be associated with a first item provided by a first vendor and with a second item provided by a second vendor.

At block 512, a marking identifier associated with the machine-readable marking is recognized. In this regard, for example, the machine-readable marking itself may be recognized or a marking identifier may be recognized based on the scanning and/or reading of the machine-readable marking (e.g., a digital marking identifier may be translated from an optical machine-readable marking). Subsequently, at block 514, the marking identifier is communicated to a central station. Although method 500 communicates the marking identifier to a central station to lookup or reference prices for the items or the multi-item product, as previously mentioned, a point of sale station can additionally or alternatively perform such functions.

At block 516, one or more item prices are received. Such item prices correspond with the items and/or multi-item product associated with the machine-readable marking. In embodiments, the item prices are received from a remote device, such as central station 412, that identifies prices using the marking identifier. The price(s) are presented to a consumer for payment of the items or multi-item product. This is indicated at block 518. Such price(s) may be presented via a display screen, a sales receipt, or the like. At block 520, payment is received from a consumer for the multi-item product. Upon receiving payment, payment disbursement to one or more appropriate vendors and/or aggregators is initiated for the price of the items associated with the machine-readable marking, as indicated at block 522.

Figure 6:
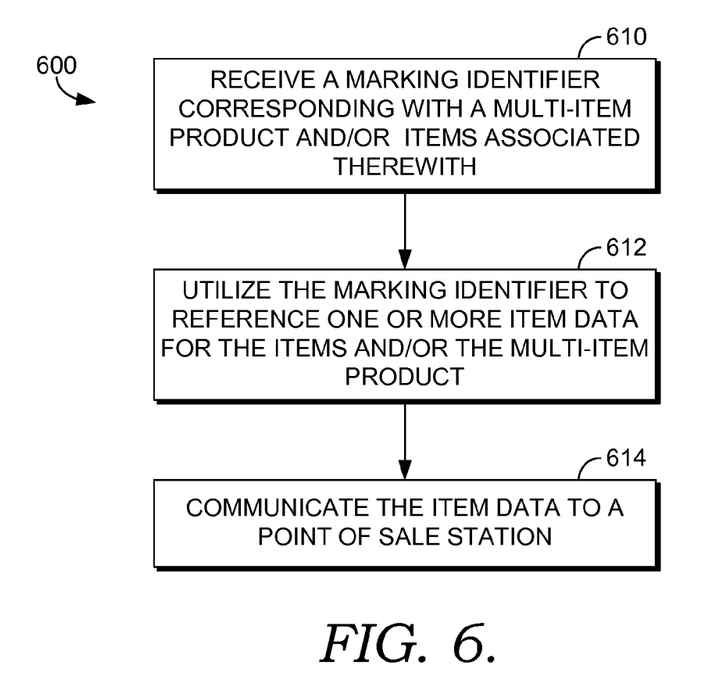
FIG. 6 is a flow chart which illustrates a second exemplary method for processing multiple items via a single retailer action, in accordance with an embodiment of the present invention.

Turning to FIG. 6, an exemplary second method 600 for processing multiple items via a single retailer action is provided. The method 600 may be performed, for example, at a central station, such as the central station 412 of FIG. 4. Initially, as indicated at block 610, a marking identifier is received. In embodiments, a marking identifier identifies a multi-item product and/or items associated therewith. For example, a marking identifier may be associated with a first item provided by a first vendor and a second item provided by a second vendor. At block 612, the marking identifier is utilized to reference one or more item data for the items and/or the multi-item product. Such item data may be, for instance, a price, a tax indicator, a tax amount, a combination thereof, or the like. At block 614, the one or more item data are communicated to a point of sale station to charge a consumer.

Figure 7:
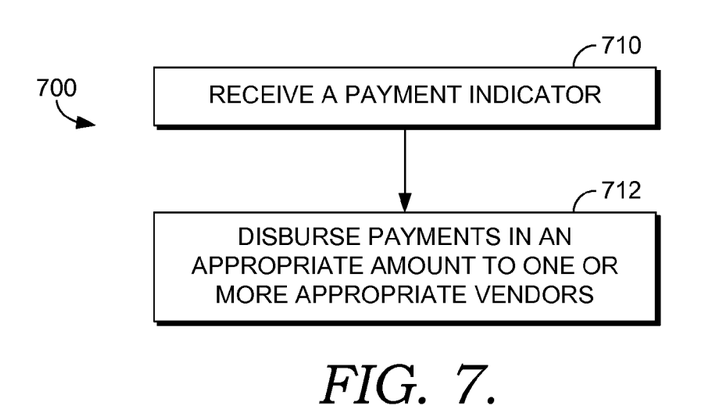
FIG. 7 is a flow chart which illustrates a third exemplary method for processing multiple items via a single retailer action, in accordance with an embodiment of the present invention.

With reference to FIG. 7, an exemplary third method 700 for processing multiple items via a single retailer action is provided. The method 700 may be performed, for example, at an aggregator, such as the aggregator 414 of FIG. 4, or at central station, such as the central station 412 of FIG. 4. Initially, as indicated at block 710, a payment indicator is received. A payment indicator provides an indication that payment for a multi-product item, or items in association therewith, have been paid for by a consumer. At block 712, payments in an appropriate amount are disbursed to one or more appropriate vendors and/or aggregators. The amount to be disbursed and the vendor/aggregator to which to disburse a payment may be determined, for example, based on information received in association with the payment indicator or information referenced (e.g., using a marking identifier).

It will be understood by those of ordinary skill in the art that the order of steps shown in the method 500 of FIG. 5, method 600 of FIG. 6, and method 700 of FIG. 7 are not meant to limit the scope of the present invention in any way and, in fact, the steps may occur in a variety of different sequences within embodiments hereof. Any and all such variations, and any combination thereof, are contemplated to be within the scope of embodiments of the present invention. Further, it is to be understood that an aggregator may be a "vendor" in accordance with embodiments of the present invention.

Many different arrangements of the various components depicted, as well as components not shown, are possible without departing from the scope of the claims below. For example, the aggregator may maintain a database which keeps track of the gift cards and information thereon (e.g., which cards have been activated and their value). Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need be carried out or need to be carried out in the specific order described.

The invention claimed is:

1. A multi-item product comprising:
a gift card coupled with a greeting card, one of the gift card and the greeting card having a first machine-readable marking associated with both a price of the greeting card provided by a first vendor and a price of the gift card provided by a second vendor,
wherein a consumer incurs a first charge corresponding with the price of the greeting card and a second charge corresponding with the price of the gift upon a single scan of the first machine-readable marking, and
wherein a first disbursement corresponding with the price of the greeting card is disbursed to the first vendor and a second disbursement corresponding with the price of the gift card is disbursed to the second vendor upon the single scan of the first machine-readable marking and a reception of a payment by the consumer for the first charge corresponding with the price of the greeting card and the second charge corresponding with the price of the gift card.

2. The product of claim 1, wherein the machine-readable marking comprises a barcode or a universal product code (UPC).

3. The product of claim 1 further comprising a second machine-readable marking comprising a magnetic strip used to activate the gift card.

4. The product of claim 1, wherein the greeting card includes a pricing portion that identifies the price of the multi-item product, the price of the gift card, the price of the greeting card, or a combination thereof.

5. The product of claim 1, wherein the machine-readable marking comprises one of a barcode, a universal product code, and a magnetic strip.

* * * * *